J. O. BROOK.
POWER DRIVEN STRIPPER OR HEADER HARVESTER.
APPLICATION FILED MAR. 14, 1916.

1,286,220.

Patented Dec. 3, 1918.

Inventor
John Oliver Brook
Attorney

UNITED STATES PATENT OFFICE.

JOHN OLIVER BROOK, OF HILLSIDE, CURBAN, NEW SOUTH WALES, AUSTRALIA.

POWER-DRIVEN STRIPPER OR HEADER HARVESTER.

1,286,220.

Specification of Letters Patent.   Patented Dec. 3, 1918.

Application filed March 14, 1916.   Serial No. 84,038.

*To all whom it may concern:*

Be it known that I, JOHN OLIVER BROOK, a British subject, residing at Hillside, Curban, in the State of New South Wales, Commonwealth of Australia, have invented new and useful Improvements in Power-Driven Stripper or Header Harvesters, of which the following is a specification.

This invention of improvements in motor-driven harvesters has reference to the means for imparting motion direct from the crank shaft of motor to the "beaters" spindle to the main propelling spindle and to the peg or threshing drum spindle and other appliances carried on the machine, and further it relates to providing such machines with a comb and a beater drum and beaters or reel, which extends transversely over the front of the full width of the framing and body of machine and especially extending over the front of the forecarriage. By aid of the latter improvements when harvesting such as wheat, oats, barley, rye or the like, the machine can be worked in crops without causing any waste of grain by its being trampled on by the traveling wheels of the harvester, also a machine can be worked through the crop in adjacent parallel lines without having to traverse around it, and thus a great saving in time and in the grain is effected.

The aforesaid improvements are mostly applicable to harvesting machines of the class known as header harvesters, combined harvesters, stripper harvesters or stripping machines. The motor employed is so assembled on the machine frame that it may be easily detached for use for any ordinary farm purposes, while the class of motor will be preferably of the type in which oil or liquid fuel is used.

The invention will now be described aided by a reference to the attached sheets of drawings wherein the above referred to improvements are illustrated.

Figure 1:
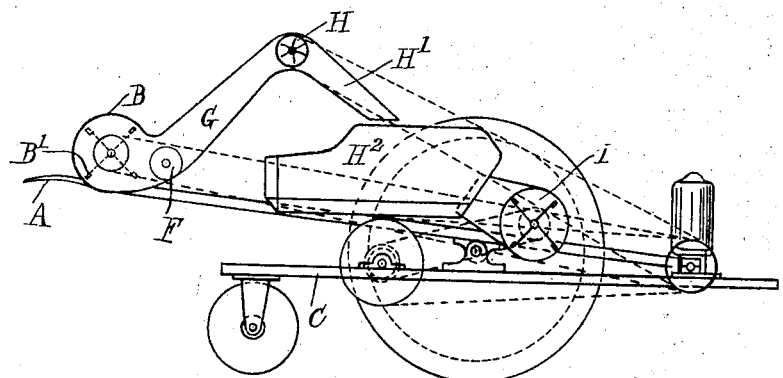

Figure 1 being an outline side view of as much of a header harvesting machine as is necessary to illustrate my improvements.

Figure 2:
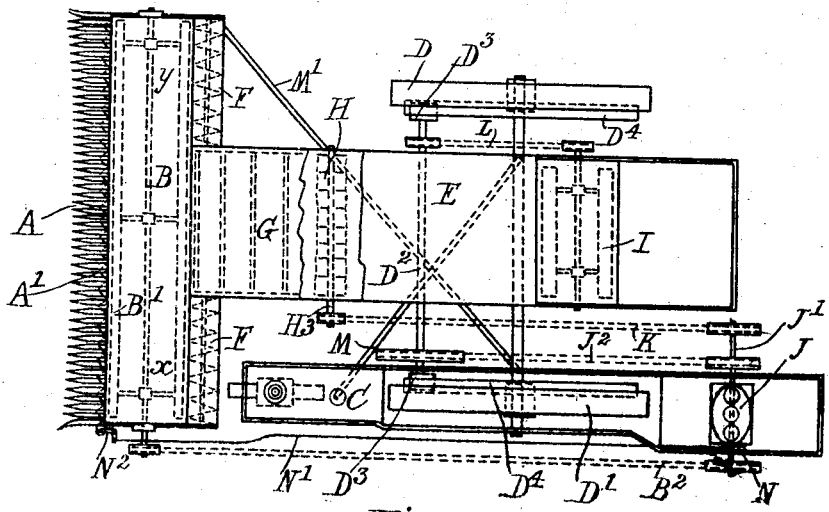

Fig. 2 an outline plan of a header harvester of the type shown in Fig. 1.

Figure 3:
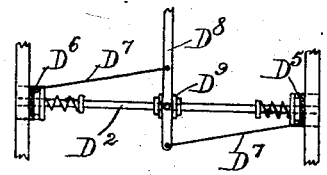

Fig. 3 shows the clutch gear provided as a means for allowing the traveling wheels of machine to be stopped while the motor and gears remain running.

A is the comb, B the beater drum and $B^1$ the beaters, the "near side" end $x$ of all of which extend to completely over the front end of the fore-carriage C, while their "off end" $y$ extends to a position beyond the line of the "off side" traveling wheel D. E is the body of the machine and as the beater drum B is wider at each end than the body it is necessary to have a worm or creeper as F or other type of conveyer or a chute to deliver the grain heads from the beaters to the up-cast elevator or throat G which delivers the grain to a peg or threshing drum as H from which the threshed heads pass through such as a chute $H^1$ to a screening appliance $H^2$ which is acted on as usual by fanners I.

Harvesters having my improvements embodied in it are driven by a motor as J preferably of the multiple cylinder type or other suitable power engine carried on the machine, and from a pulley on motor crank shaft $J^1$, the traveling wheels D and $D^1$ are propelled through the intervention of belt $J^2$ imparting motion to a shaft $D^2$ having at each of its ends a pinion $D^3$ which gear with internal toothed wheels $D^4$ mounted on the main traveling wheels D and $D^1$. In like manner another pulley on motor crank shaft $J^1$ imparts motion by belt K to a pulley on the peg drum of thresher spindle $H^3$ and a pulley on near end of motor shaft drives the beaters $B^1$ by aid of belt $B^2$; also a pulley is provided on shaft $D^2$ to impart motion by belt L to a pulley on the spindle of fanners I, while the aforesaid worm creepers F may be driven from any moving part of the machine which will provide the requisite speed. M is a diagonal stay, the fore end of which is attached to the usual lifting gear on fore-carriage C, while $M^1$ is a reversely arranged stay for supporting the "off" outer end or cheek of the beater drum, and creeper.

Both ends of the aforesaid spindle $D^2$ which carries the pinions $D^3$ are furnished with spring operated sliding tooth clutches $D^5$ arranged as is shown in Fig. 3, wherein each grooved sliding half of tooth clutch has a fork or ring $D^6$ upon it, connected by oppositely arranged rods $D^7$ to a sway lever $D^8$ centered on a loose block $D^9$ arranged between collars on spindle $D^2$ so that by levers $D^x$ being connected by a rod or otherwise within reach of the driver he can, by operating the lever in the proper direction, cause the machine to stop traveling and at the same time allow the various other gears and appliances to be kept running.

All the other movable appliances in the machine will be driven or receive motion either direct from the crank shaft of motor or from aforesaid main propelling spindle.

As an alternative, in place of driving the beaters and other parts with belting and pulleys suitable sprockets for chain belting or grooved pulleys for rope belting may be employed. Also all the main bearings have annular or other grease cups each of a capacity to hold about one quarter pound of grease.

I wish it to be understood that so far as the arrangement of the beater drum beaters and comb in front of the fore-carriage is concerned, such parts may either be separable from or be fixed to the machine, and the same applies to the off side of machine wherein the beater drum, and comb lie in front of the off side wheel, although I am aware that this latter feature is already in use, but not as devised by me along with the "near end" arranged in front of the fore-carriage.

What I do claim as my invention, and desire to secure by Letters Patent, is—

1. A harvesting machine comprising an axle, wheels journaled on said axle, a fore-carriage carried by one end of said axle and receiving one of said wheels, threshing apparatus in advance of said wheels, intersecting diagonally disposed supporting stays connecting said threshing apparatus to the axle and forecarriage, a smaller wheel carried by the forward end of said forecarriage, a motor on the rear end of said forecarriage, and means for operatively connecting the motor to said wheels and said threshing apparatus.

2. A harvesting and threshing machine comprising a wheeled supporting frame, harvesting mechanism comprising a beater drum carried by and located in advance of said frame, a comb in advance of said beater drum, a beater journaled in said drum, a conveyer chute connected to said drum, threshing apparatus in said chute, a receptacle at the rear end of said chute, a fan connected with said receptacle, a motor supported independently of the harvesting and threshing apparatus, and shafts, pulleys and belts, arranged to operatively connect said motor to the harvesting and threshing apparatus, the fan, and to the wheels of said frame.

In testimony whereof I have signed my name to this specification in the presence of two subscribing witnesses.

JOHN OLIVER BROOK.

Witnesses:
   BEDLINGTON BODYCOMB,
   LESLIE LAWTON BEAR.